(12) United States Patent
Neimann (10) Patent No.: US 9,648,859 B2
(45) Date of Patent: May 16, 2017

(54) RELEASE DEVICES FOR FISHING RIGS

(71) Applicant: Chris Neimann, Portland, OR (US)

(72) Inventor: Chris Neimann, Portland, OR (US)

( * ) Notice: Subject to any disclaimer, the term of this patent is extended or adjusted under 35 U.S.C. 154(b) by 46 days.

(21) Appl. No.: 14/746,450

(22) Filed: Jun. 22, 2015

(65) Prior Publication Data

US 2015/0282466 A1 Oct. 8, 2015

(51) Int. Cl.
*A01K 91/08* (2006.01)
(52) U.S. Cl.
CPC .................... *A01K 91/08* (2013.01)
(58) Field of Classification Search
CPC ................. A01K 91/08; A01K 97/00
USPC ............................. 43/43.12, 43.13
See application file for complete search history.

(56) References Cited

U.S. PATENT DOCUMENTS

| | | | | |
|---|---|---|---|---|
| 2,170,594 A * | 8/1939 | Nicholson | .............. | A01K 91/08 43/43.12 |
| 2,749,648 A * | 6/1956 | Schneider | .............. | A01K 91/08 43/17 |
| 2,749,649 A * | 6/1956 | Fitzsimmons | ......... | A01K 91/08 43/43.12 |
| 2,819,555 A * | 1/1958 | Jackson | ................. | A01K 95/00 24/115 G |
| 2,925,682 A * | 2/1960 | Kravitch | ................ | A01K 91/08 24/502 |
| 2,958,973 A * | 11/1960 | Le May | ................ | A01K 91/08 24/545 |
| 3,026,646 A * | 3/1962 | Weaver | ................... | A01K 91/08 43/43.12 |
| 3,081,575 A * | 3/1963 | Meisner | ................. | A01K 91/08 43/43.12 |
| 3,181,266 A * | 5/1965 | Leufvenius | ............ | A01K 91/06 43/43.13 |
| 3,643,370 A * | 2/1972 | Cook | ..................... | A01K 95/00 43/43.12 |
| 3,766,681 A * | 10/1973 | Mander | .................. | A01K 91/08 43/43.12 |
| 3,816,954 A * | 6/1974 | Bissonette | ............ | A01K 91/08 43/43.12 |
| 3,818,624 A * | 6/1974 | Duffy | ..................... | A01K 91/08 43/43.13 |
| 3,835,573 A * | 9/1974 | Borchardt | .............. | A01K 91/08 43/43.12 |
| 3,892,083 A * | 7/1975 | Peterson | ................ | A01K 91/08 43/43.11 |

(Continued)

*Primary Examiner* — Darren W Ark
(74) *Attorney, Agent, or Firm* — Mohr Intellectual Property Law Solutions, PC (57) ABSTRACT

Release devices for fishing rigs including a body, a mount, a compression assembly, and a friction member. The body includes a joint a base that extends from the joint, and a clamp vertically spaced from the base and extending from the joint. The mount pivotally mounts to the base at a second end of the body and cooperates with the clamp to pivot the mount between a retaining position and a release position. The compression assembly is configured to selectively adjust how much the clamp compresses the mount when the mount is in the retaining position. The friction member mounts between the clamp and the base about a vertical axis and is configured to selectively engage the fishing line retained the mount to restrict the fishing line from moving relative to the mount.

15 Claims, 8 Drawing Sheets

(56) References Cited

U.S. PATENT DOCUMENTS

| | | | | |
|---|---|---|---|---|
| 3,905,148 A * | 9/1975 | Naone | A01K 91/08 24/634 |
| 4,069,611 A * | 1/1978 | Dusich | A01K 91/08 43/43.12 |
| 4,173,091 A * | 11/1979 | Emory, Jr. | A01K 91/08 43/43.12 |
| 4,221,068 A * | 9/1980 | Roemer, Jr. | A01K 91/08 43/43.12 |
| 4,395,841 A * | 8/1983 | Cudnohufsky | A01K 91/08 43/43.12 |
| 4,428,142 A * | 1/1984 | Shedd | A01K 91/08 43/42.04 |
| 4,430,823 A * | 2/1984 | Henze | A01K 91/08 43/43.12 |
| 4,453,336 A * | 6/1984 | Lowden | A01K 91/08 24/532 |
| 4,574,516 A * | 3/1986 | Shedd | A01K 91/08 43/42.04 |
| 4,574,518 A * | 3/1986 | Shedd | A01K 91/08 43/42.04 |
| 4,813,172 A * | 3/1989 | McCue | A01K 91/08 43/43.12 |
| 4,945,670 A * | 8/1990 | Wetherald | A01K 91/08 43/43.12 |
| 5,107,616 A * | 4/1992 | Ryder | A01K 91/08 43/43.12 |
| 5,170,581 A * | 12/1992 | Lyons | A01K 97/125 43/17 |
| 5,337,510 A * | 8/1994 | McCue | A01K 91/08 43/43.12 |
| 5,339,561 A * | 8/1994 | Weber | A01K 91/08 43/43.13 |
| 5,495,691 A * | 3/1996 | Keisala | A01K 91/08 43/43.12 |
| 6,016,622 A * | 1/2000 | Even | A01K 91/08 43/43.13 |
| 6,256,924 B1 * | 7/2001 | Walker | A01K 97/125 43/43.13 |
| 6,412,215 B1 * | 7/2002 | Even | A01K 91/08 43/43.13 |
| 7,178,284 B2 * | 2/2007 | Chamberlain | A01K 91/08 43/43.12 |
| 7,703,235 B2 * | 4/2010 | Ford | A01K 91/08 43/42.22 |
| 7,984,582 B2 * | 7/2011 | Brinker | A01K 91/08 43/43.12 |
| 8,695,271 B1 * | 4/2014 | Ehlers | A01K 91/08 43/42.74 |
| 8,776,429 B2 * | 7/2014 | Ford | A01K 91/08 43/42.23 |
| 2005/0102885 A1 * | 5/2005 | Albrant, Jr. | A01K 91/08 43/43.12 |
| 2008/0060253 A1 * | 3/2008 | Even | A01K 91/08 43/43.13 |

\* cited by examiner

RELEASE DEVICES FOR FISHING RIGS

BACKGROUND

The present disclosure relates generally to fishing devices. In particular, release devices for fishing rigs are described.

Fishing rigging systems or fishing rigs are commonly utilized by amateur and professional fisherman to fish more effectively for certain types of fish using trolling techniques. Common fishing rigs include downrigger and outrigger systems. Downrigger systems are used to target fish deeper in the water whereas outrigger systems are most often used to target fish near the surface of the water. Both systems involve a rigging line couple to a boom secured to a boat and a fishing line coupled to the rigging line via a release device configured to selectively release the fishing line from the rigging line.

Known release devices are not entirely satisfactory for the range of applications in which they are employed. For example, conventional release devices rely on pinch pads or fine wire as release mechanisms. Release mechanisms relying on pinch pads and fine wire are subject to false tripping, i.e., releasing at inappropriate times.

Existing release devices relying on pinch pads or fine wire are also subject to damaging the fishing line. Importantly, conventional release devices relying on pinch pads or fine wire are generally not capable of being adjusted tight enough to work properly with braided fishing line. Braided fishing line is often necessary to hold large flashers and bait at significant depth, in heavy current, or at faster trolling speeds.

Existing release devices are not adapted well for smaller, lighter weight fish. In addition, conventional release devices are either limited to releasing fishing lines under a fixed tension or under an undesirably small range of tensions with only coarse tension adjustment capabilities. The fixed or small range of release tensions tend to be relatively large tension values, suitable for only large fish. There is a need for release devices that better target small fish and that release at a wider range of tension values with fine adjustments.

Further, conventional release devices are not adequately configured to be readily used on either side of a boat without tangled fishing line complications. In particular, conventional devices include threaded fasteners that can not be readily installed on either side of the device. A fixed position fastener does not properly account for the orientation of the device in the water resulting from the device's position on a given side of the boat and the way the fishing line is secured by the release device.

Conventional release devices with fixed position fasteners suffer from tangled fishing lines on at least one side of the boat because buoyancy factors will generally orient the fastener downwards. Depending on the way the fishing line is secured by the release device, the release device moving to a position where the fastener is oriented downwards can tangle the fishing line and cause a host of complications. It would be desirable to have a release device that could easily and conveniently be used with rigging systems disposed on either side of a boat.

Another limitation of existing release devices is their inability to selectively engage the fishing line to selectively allow or restrict the fishing line from extending out farther while trolling. Some trolling techniques benefit from allowing or restricting the fishing line to extend while trolling. However, conventional release devices generally must be swapped out entirely to switch from a fixed length fishing line configuration or an extending line configuration. It would be more effective and convenient to have a release device that could be adjusted to allow either type of configuration.

Thus, there exists a need for release devices that improve upon and advance the design of known release devices. Examples of new and useful release devices relevant to the needs existing in the field are discussed below.

Disclosure addressing one or more of the identified existing needs is provided in the detailed description below. Examples of references relevant to release devices include U.S. Pat. No. 6,751,222 and D247300. The complete disclosures of the above patents are herein incorporated by reference for all purposes.

SUMMARY

The present disclosure is directed to release devices for fishing rigs including a body, a mount, a compression assembly, and a friction member. The body includes a joint, a base that extends from the joint, and a clamp vertically spaced from the base and extending from the joint. The mount pivotally mounts to the base at a second end of the body and cooperates with the clamp to pivot the mount between a retaining position and a release position. The compression assembly is configured to selectively adjust how much the clamp compresses the mount when the mount is in the retaining position. The friction member mounts between the clamp and the base about a vertical axis and is configured to selectively engage the fishing line retained by the mount to restrict the fishing line from moving relative to the mount.

DETAILED DESCRIPTION

The disclosed release devices will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various release devices are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in all example explained previously. Features specific to a given example will be described in that particular example. The reader should understand that a given feature need not be the same or similar to the specific portrayal of a related feature in any given figure or example.

With reference to FIGS. 1-8, a first example of a release device for fishing rigs, release device 100, will now be described. Release device 100 functions to selectively secure a fishing line 104 to a rigging line 102 and to selectively release fishing line 104 from rigging line 102 when a fish pulls on fishing line 104 above a selected, threshold tension. The reader will appreciate from the figures and the description below how release device 100 addresses shortcomings present in conventional release devices.

For example, release device 100 is configured to selectively release fishing line 104 from rigging line 102 when a relatively small fish pulls on fishing line 104 and exerts a relatively small amount of tension in fishing line 104. Further, the selected release tension or threshold tension can be finely adjusted over a substantially continuous, wide range as opposed to discrete, relatively large, coarse adjustments.

Those skilled in the art will appreciate how release device 100 can be effectively utilized on either side of a boat without tangling the fishing line given its ability to reverse the position of the bolt to position the bolt on the side of the release device that should be oriented downwards.

Release device 100 is configured to selectively restrict or allow fishing line 104 to extend and retract relative to release device 102 by adjusting its configuration. The adjustment needed to allow or restrict fishing line 104 from extending is readily accomplished on a boat while on the water and does not require a different release device to be used.

Figure 1:
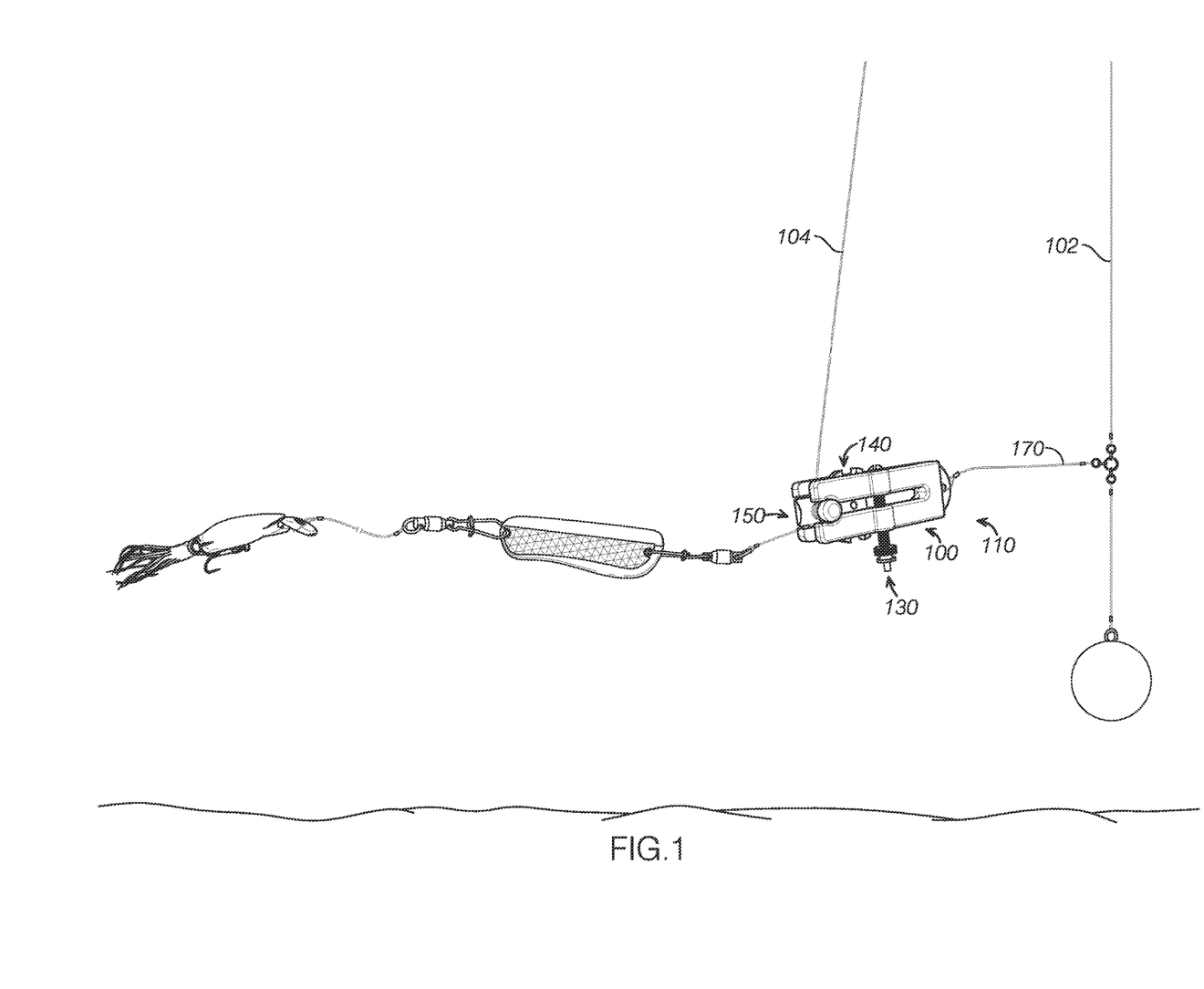
FIG. 1 is a perspective view of a release device coupled to a rigging line via a leash on a first end of the release device and a fishing line wrapped around a mount of the release device on a second end of the release device.
Figure 2:
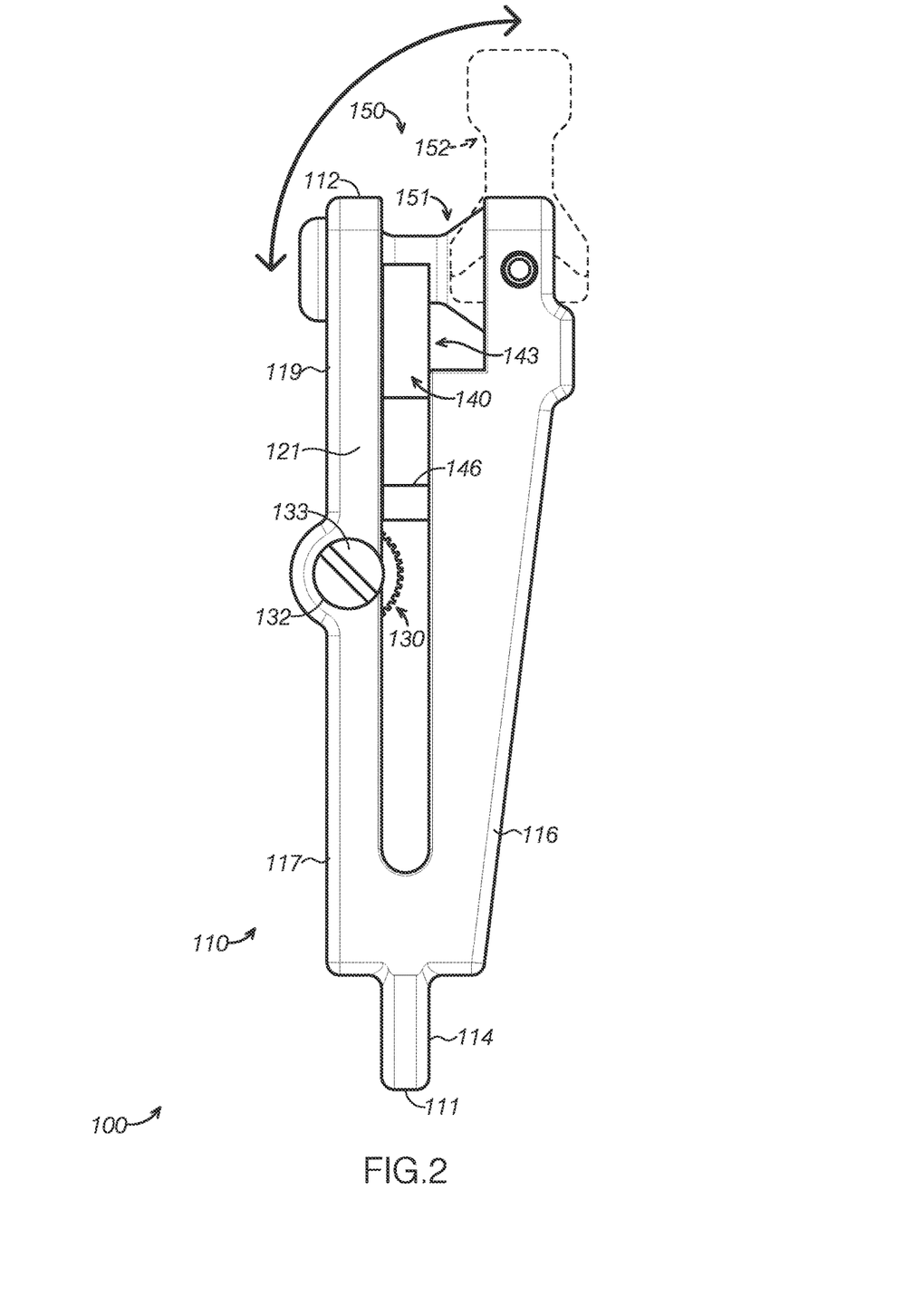
FIG. 2 is an elevation view of a first lateral side the release device shown in FIG. 1 depicting a mount in a retaining position in solid lines and a release position in dashed lines.
Figure 3:
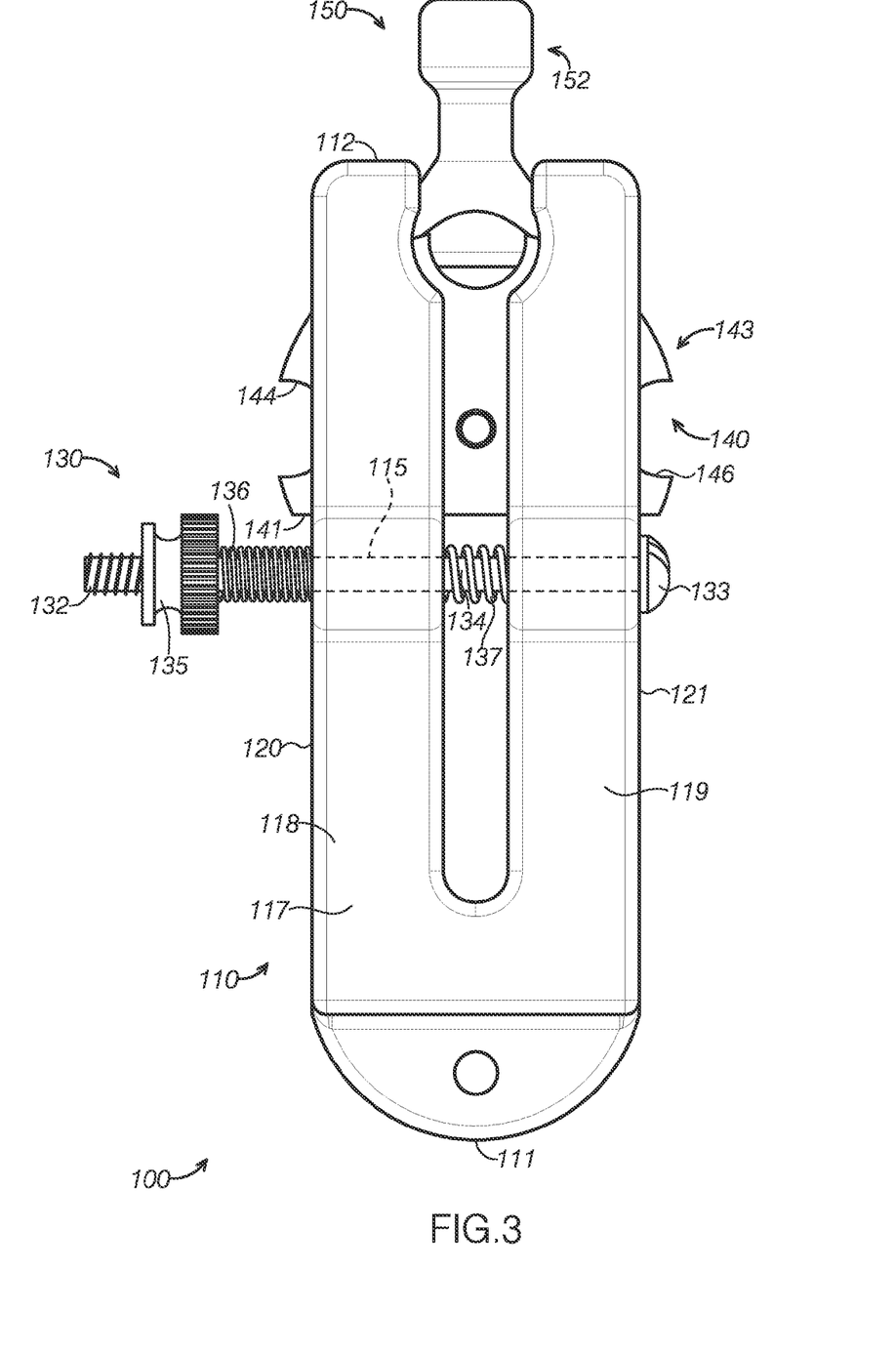
FIG. 3 is a plan view of a top side of the release device shown in FIG. 1 depicting friction member in an engaged position and the mount in the release position.

As can be seen in FIGS. 1-3, release device 100 includes a body 110, a mount 150, a compression assembly 130, friction member 140, and a leash 170. In other examples, the release device does not include a leash and instead couples to the rigging line via the body.

Body.

As can be seen in FIGS. 2-6, body 110 extends longitudinally between a first end 111 and a second end 112 opposite first end 111. First end 111 is positioned proximate rigging line 102, and fishing line 104 interfaces with release device 100 proximate second end 112.

Figure 4:
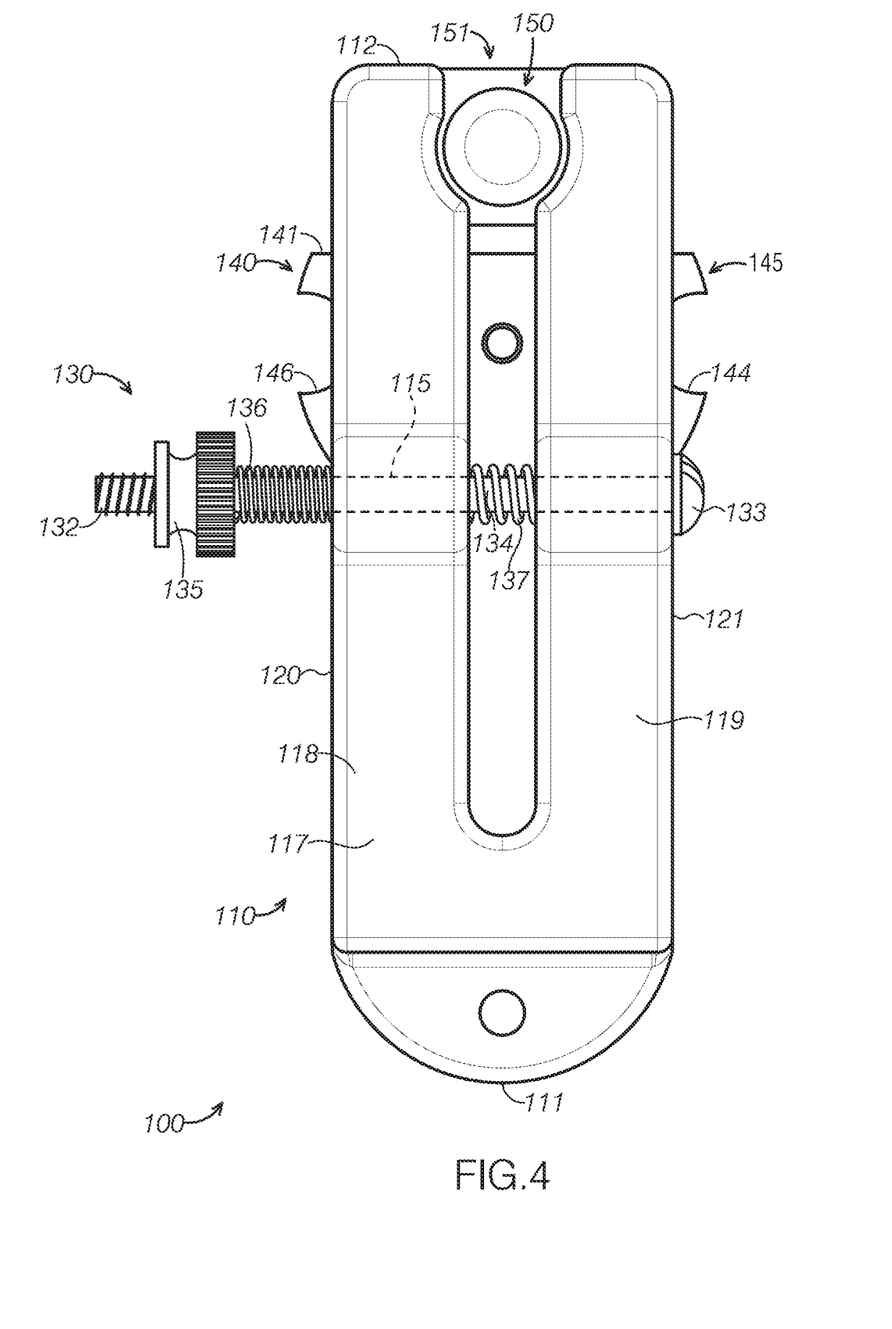
FIG. 4 is a plan view of the top side of the release device shown in FIG. 1 depicting the friction member in a disengaged position and the mount in the retaining position.
Figure 5:
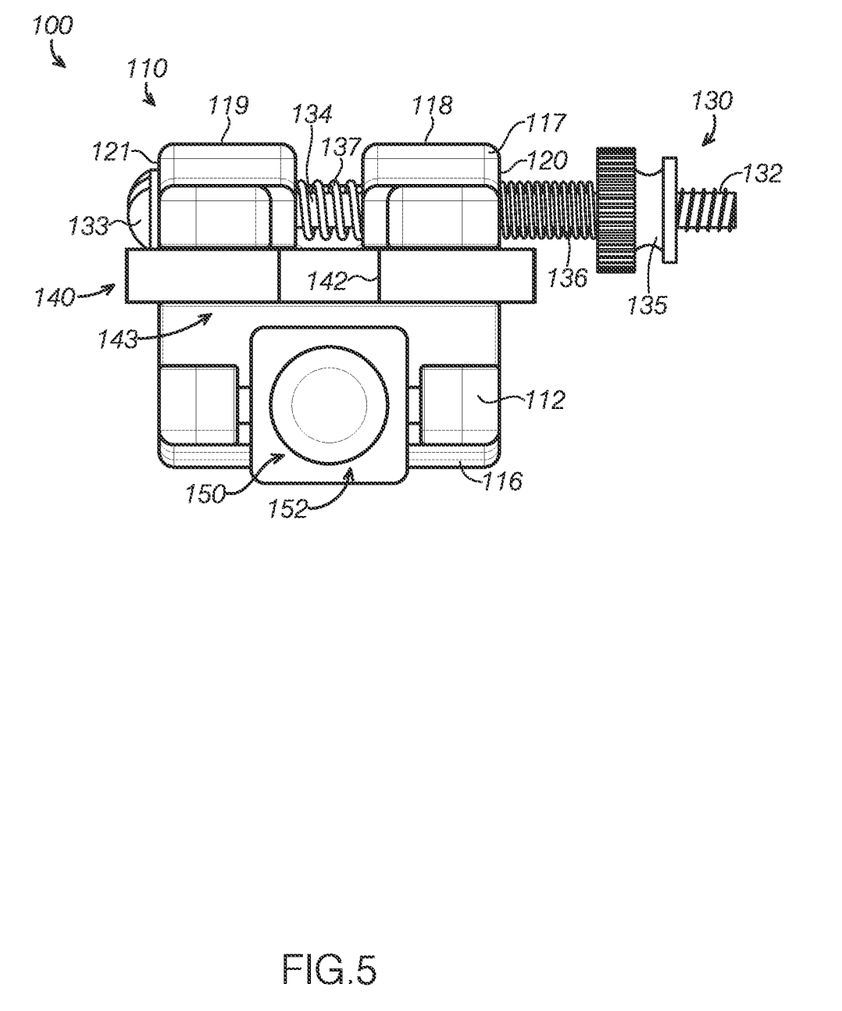
FIG. 5 is an elevation view of the second end of the release device shown in FIG. 1 depicting the mount in the release position and the friction member in the engaged position.

In the present example, body 110 includes a joint 114, a base 116, and a clamp 117. With reference to FIGS. 2-4, the reader can see that joint 114 is disposed at first end 111 and base 116 extends from joint 114 to second end 112.

Referencing FIGS. 2-6, clamp 117 is vertically spaced from base 116 and extends from joint 114 to second end 112.

Clamp 117 defines a first lateral side 120 and a second lateral side 121 opposite first lateral side 120. The reader can see in the figures that clamp 117 includes a first arm 118 extending from joint 114 to second end 112 and a second arm 119 laterally spaced from first arm 118, where second arm 119 also extends from joint 114 to second end 112.

As shown in FIGS. 2-6, clamp 117 defines a bore 115 extending laterally through clamp 117 from first lateral side 120 to second lateral side 121. In particular, bore 115 extends laterally through clamp 117 from first lateral side 120 to second lateral side 121.

Bore 115 is complimentarily configured with a bolt 132 of compression assembly 131 and cooperates with compression assembly 130 to compress body 110. In the present example, bore 115 is smooth to facilitate extending bolt 132 through bore 115 from either side of clamp 117. In this manner, the user can selectively position bolt 132 to extend from clamp 117 on the side that should be oriented downwards in the water to avoid tangling the fishing line. In other examples, the bore may be threaded or include other surface features to interact with the bolt.

Mount.

Figure 6:
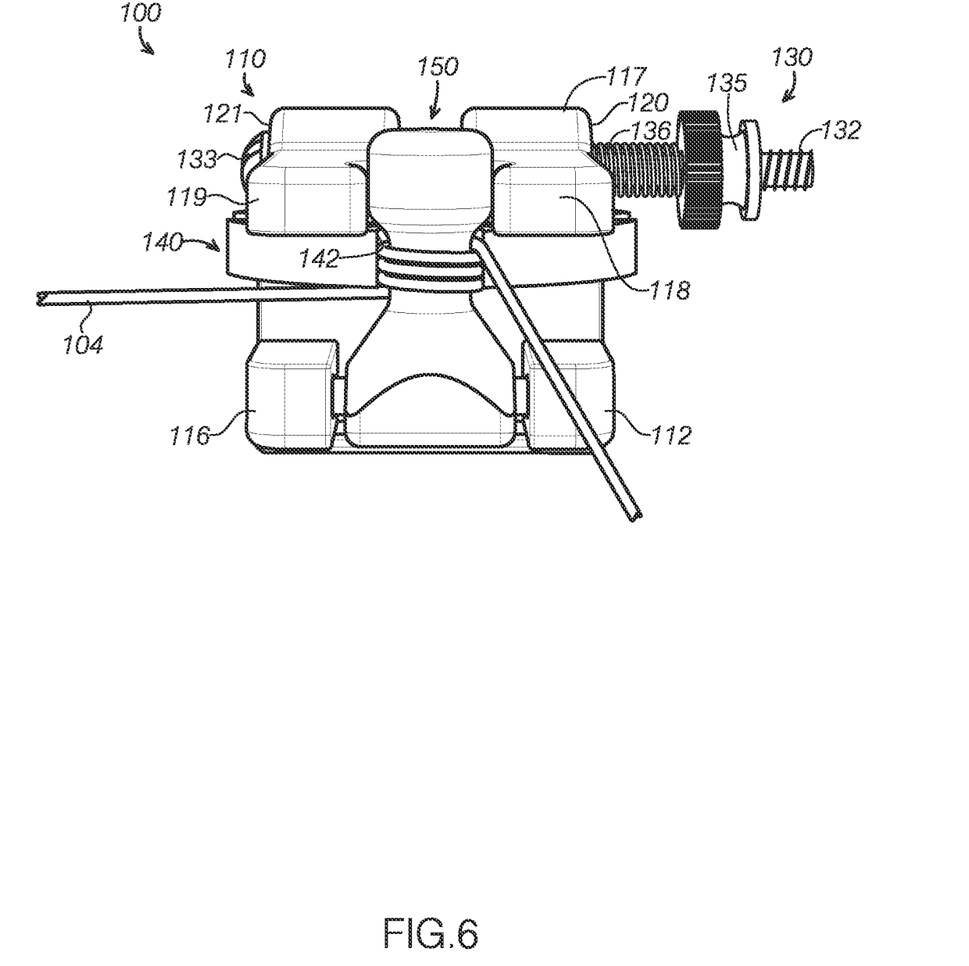
FIG. 6 is an elevation view of the second end of the release device shown in FIG. 1 depicting the mount in the retaining position and the friction member in the engaged position engaging the fishing line wrapped around the mount.
Figure 7:
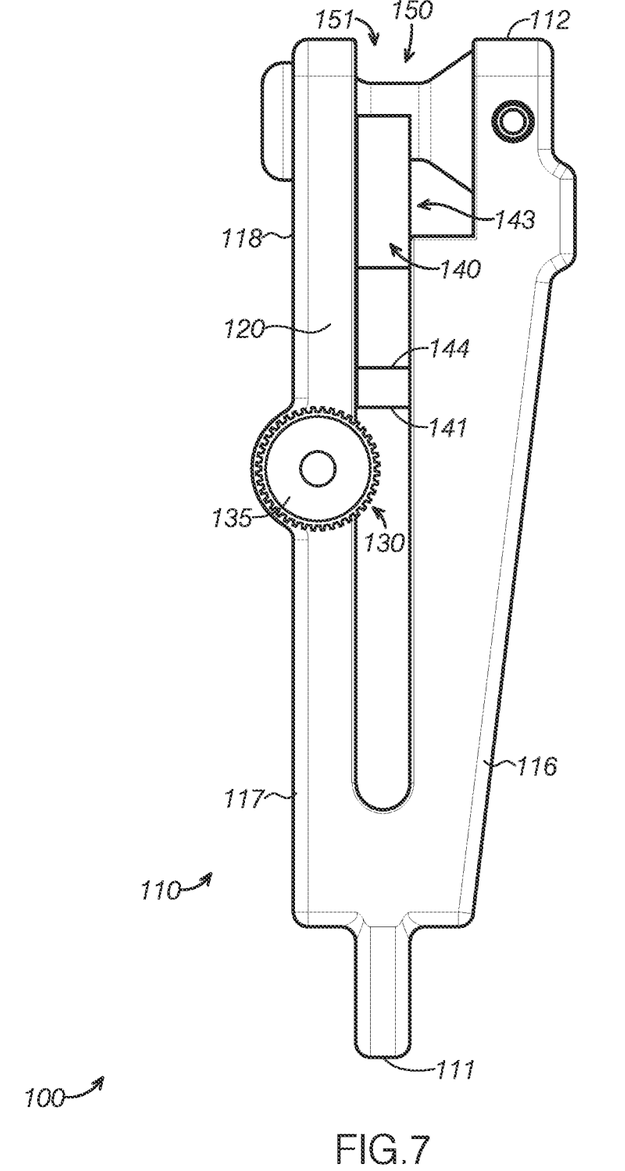
FIG. 7 is an elevation view of a second lateral side the release device shown in FIG. 1 depicting the mount in the retaining position and the friction member in the engaged position.
Figure 8:
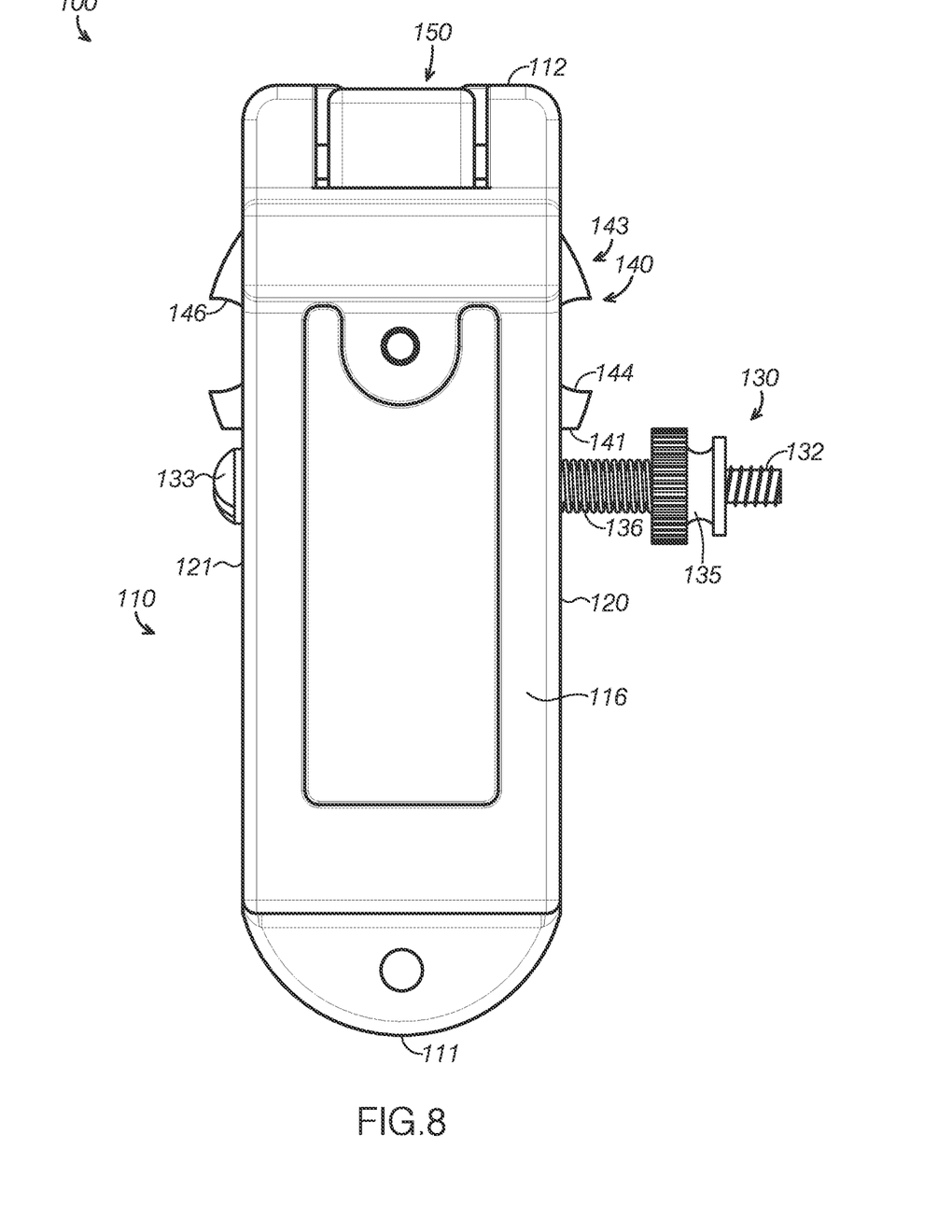
FIG. 8 is a plan view of a bottom side of the release device shown in FIG. 1 depicting a second and third recess of the friction member extending to lateral sides of the release device when the friction member is in the engaged position.

As shown in FIGS. 1 and 6, mount 150 functions to selectively retain fishing line 104. In the present example, fishing line 104 is wrapped around mount 150 to define a spool. In other configurations, the fishing line is retained by the mount by other means such as a compression fit, friction fit, or notch.

In the present example shown in FIGS. 1-8, mount 150 defines a bobbin. However, the mount may be any shape or configuration suitable for selectively retaining a fishing line.

As shown in FIG. 2 and others, mount 150 is pivotally mounted to base 116 at second end 112 of body 110. Mount 150 cooperates with clamp 117 to pivot mount 150 between a retaining position 151 and a release position 152. In retaining position 151 shown in solid lines in FIG. 2 and also in FIGS. 1 and 6, mount 150 is compressively engaged by clamp 117 at second end 112 of body 110 and selectively retains fishing line 104. In release position 152 shown in dashed tines in FIG. 2 and in FIGS. 3 and 5, mount 150 is spaced from clamp 117 and selectively releases fishing line 104.

Compression Assembly.

Compression assembly 130 functions to selectively adjust how much clamp 117 compresses mount 150 when mount 150 is in retaining position 151. As shown in FIGS. 1-8, compression assembly 130 includes bolt 132, a fastener 135, a first biasing member 136, and a second biasing member 137. The first and second biasing members are optional components and some release device examples omit one or both of them. For example, the release device may include a single biasing member, no biasing member, or more than two biasing members.

Bolt 132 includes a head 133 disposed on second lateral side 121 of clamp 117 and a shank 134 extending through smooth bore 115. Fastener 135 is mounted to shank 134 at first lateral side 120 of clamp 117 opposite second lateral side 121 of clamp 117 at a selected position on shank 134. Compression assembly 130 may be disposed in an orientation opposite to that shown in FIGS. 1-8; namely, head 133 may be disposed on first lateral side 120 and fastener 135 may be disposed on second lateral side 121.

In the example shown in FIGS. 1-8, biasing member 136 is coaxially mounted to shank 134 and disposed between fastener 135 and first lateral side 120 of clamp 117. Second biasing member 137 is coaxially mounted to shank 134 and disposed between first arm 118 and second arm 119. In the present example, first biasing member 136 and second biasing member 137 are both springs, but any member or device suitable to exert a biasing force may be used.

Fastener 135 is configured to adjust the compression exerted by clamp 117 on mount 150 in retaining position 151. The compression exerted by compression assembly 130 is adjusted by securing fastener 135 to shank 134 in a position selected to cause fastener 135 to exert a selected amount of force against clamp 117.

In the present example, first biasing member 136 second biasing member 137, and fastener 133 cooperate to adjust the compression exerted by clamp 117 on mount 150 in retaining position 151. The compression assembly components cooperate to establish a desired retaining compression on mount 150 that releases mount 150 and fishing line 104 when a fish pulls on the fishing line with a set amount of force (typically corresponding to its size and weight). Expressed another way, the desired retaining compression is selected to cause mount 150 to move from retaining position 151 to release position 152 when fishing line 104 is under a selected minimum amount of tension corresponding to a desired type of fish pulling on fishing line 104.

The compression assembly components cooperate by securing fastener 135 to shank 134 in a position on shank 134 that compresses biasing member 136 to a length selected to cause biasing member 136 to exert a desired first bias force against clamp 117. The components further cooperate to compress second biasing member 137 to a length selected to cause it to exert a desired second bias force against clamp 117. In the present example, the first bias force increases the compression exerted by clamp 117 and the second bias force decreases the compression exerted by clamp 117. The cooperation and opposing relationship of first biasing member 136 and second biasing member 137 enables fine compression adjustments to be made. However, satisfactory compression adjustments are possible with a single biasing member or no biasing member.

Friction Member.

Friction member 140 is configured to selectively engage fishing line 104 retained by mount 150 to frictionally restrict fishing line 104 from moving relative to mount 150. Friction member 140 can be adjusted to selectively not engage fishing line 104 on mount 150 to allow fishing line 104 to move relative to mount 150, i.e., to extend and retract, while trolling for fish.

As the reader can see in FIGS. 3-8, friction member 140 is mounted between clamp 117 and base 116 about a vertical axis. Friction member 140 defines a first recess 142, a second recess 144, and a third recess 146 at circumferential positions offset from each other. In some examples, the friction member defines just a single recess. In other examples, the friction member does not define recesses. In still further examples, the friction member defines more than three recesses.

The recesses are complimentarily configured with mount 150 to receive mount 150 within the recess and frictionally engage fishing line retained by mount 150. Friction member 140 is configured to rotate between an engaged position 143 shown in FIGS. 2, 3, and 5-8 and a disengaged position 145 shown in FIG. 4. In engaged position 143 shown in FIGS. 2, 3, and 5-8, recess 142 receives mount 150 when mount 150 is in retaining position 151 and frictionally engages fishing line 104 retained by mount 150 to restrict fishing line 104 from moving relative to mount 150. In disengaged position 145 shown in FIG. 4, friction member 140 is spaced from fishing line 104 retained by mount 150 and does not restrict fishing line 104 from moving relative to mount 150.

In the example shown in FIGS. 1-8, friction member 140 defines a truncated disk having a truncated portion 141. Truncated portion 141 is disposed towards mount 150, but spaced from mount 150, when friction member 140 is in disengaged position 145 shown in FIG. 4.

Friction member 140 is made from rubber, which provides a suitably high coefficient of friction to effectively engage and retain fishing line 104. The friction member may be comprised of any currently known or later developed material that enables it to frictionally engage the fishing line to frictionally restrict it from moving relative to the mount.

Leash.

Leash 170 functions to couple body 110 to rigging line 102. As can be seen in FIG. 1, leash 170 is coupled to joint 114 and to rigging line 102. Leash 170 is comprised of clear tubing, but may be any elongate tension bearing member. In some examples, the release device does not include a leash, but instead the body is configured to couple directly to the rigging line.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new whether they are directed to the same invention or a different invention and whether they are different, broader, narrower or equal in scope to the original claims, are to be considered within the subject matter of the inventions described herein.

The invention claimed is:

1. A release device for fishing rigs including a rigging line and a fishing line, the release device comprising:
  a body that extends longitudinally between a first end configured to be positioned proximate the rigging line and a second end opposite the first end and configured to be positioned proximate the fishing line, the body including:
    a joint disposed at the first end;
    a base that extends from the joint to the second end; and
    a clamp vertically spaced from the base and extending from the joint to the second end, the clamp defining a first lateral side and a second lateral side opposite the first lateral side, the clamp defining a bore extending laterally through the clamp from the first lateral side to the second lateral side and including:
      a first arm extending from the joint to the second end; and
      a second arm laterally spaced from the first arm and extending from the joint to the second end;

a mount for selectively retaining the fishing line, the mount being pivotally mounted to the base at the second end of the body and cooperating with the clamp to pivot the mount between a retaining position and a release position, where the mount is compressively engaged by the clamp at the second end of the body and selectively retains the fishing line in the retaining position and where the mount is spaced from the clamp and selectively releases the fishing line in the release position; and a compression assembly configured to selectively adjust how much the clamp compresses the mount when the mount is in the retaining position, the compression assembly including:
  a bolt having a head disposed on the second lateral side of the clamp and a shank extending through the bore;
  a fastener mounted to the shank at the first lateral side of the clamp at a selected position on the shank;
  a first biasing member coaxially mounted to the shank and disposed between the fastener and the first lateral side of the clamp; and
  a second biasing member coaxially mounted to the shank and disposed between the first arm and the second arm.

2. The release device of claim 1, wherein the bore is smooth.

3. The release device of claim 1, wherein the first biasing member, the second biasing member, and the fastener cooperate to adjust a compression exerted by the clamp on the mount in the retaining position by securing the fastener to the shank in a position on the shank that compresses the first biasing member and the second biasing member to respective lengths selected to cause the first biasing member to exert a desired first bias force against the clamp and the second biasing member to exert a desired second bias force against the clamp, where the first bias force increases the compression exerted by the clamp and the second bias force decreases the compression exerted by the clamp.

4. The release device of claim 1, further comprising a friction member mounted between the clamp and the base about a vertical axis, the friction member defining a recess complimentarily configured with the mount, the friction member being configured to rotate between an engaged position and a disengaged position, where in the engaged position the recess receives the mount when the mount is in the retaining position and frictionally engages the fishing line retained by the mount to restrict the fishing line from moving relative to the mount and in the disengaged position the friction member is spaced from the fishing line retained by the mount and does not restrict the fishing line from moving relative to the mount.

5. The release device of claim 4, wherein the friction member defines a truncated disk having a truncated portion, the truncated portion being disposed towards the mount and spaced from the mount when the friction member is in the disengaged position.

6. A release device for fishing rigs including a rigging line and a fishing line, the release device comprising:
  a body that extends longitudinally between a first end configured to be positioned proximate the rigging line and a second end opposite the first end and configured to be positioned proximate the fishing line, the body including:
    a joint disposed at the first end;
    a base that extends from the joint to the second end; and
    a clamp vertically spaced from the base and extending from the joint to the second end, the clamp defining a first lateral side and a second lateral side opposite the first lateral side, the clamp including a first arm extending from the joint to the second end and a second arm laterally spaced from the first arm and extending from the joint to the second end;
  a mount for selectively retaining the fishing line, the mount being pivotally mounted to the base at the second end of the body and cooperating with the clamp to pivot the mount between a retaining position and a release position, where the mount is compressively engaged by the clamp at the second end of the body and selectively retains the fishing line in the retaining position and where the mount is spaced from the clamp and selectively releases the fishing line in the release position;
  a compression assembly configured to selectively adjust how much the clamp compresses the mount when the mount is in the retaining position; and
  a friction member mounted between the clamp and the base about a vertical axis, the friction member defining a recess complimentarily configured with the mount, the friction member being configured to rotate between an engaged position and a disengaged position, where in the engaged position the recess receives the mount when the mount is in the retaining position and frictionally engages the fishing line retained by the mount to restrict the fishing line from moving relative to the mount and in the disengaged position the friction member is spaced from the fishing line retained by the mount and does not restrict the fishing line from moving relative to the mount;
wherein:
  the clamp defines a smooth bore extending laterally through the first arm and the second arm of the clamp and the compression assembly interfaces with the smooth bore;
  the compression assembly includes:
    a bolt having a head disposed on the second lateral side of the clamp and a shank extending through the smooth bore;
    a fastener mounted to the shank at the first lateral side of the clamp opposite the second lateral side of the clamp at a selected position on the shank; and
    a biasing member coaxially mounted to the shank and disposed between the fastener and the first lateral side of the clamp;
  the biasing member defines a first biasing member and the compression assembly further comprises a second biasing member coaxially mounted to the shank and disposed between the first arm and the second arm.

7. The release device of claim 6, further comprising a leash coupled to the joint and configured to couple with the rigging line.

8. The release device of claim 6, wherein the fastener is configured to adjust a compression exerted by the clamp on the mount in the retaining position by securing to the shank in a position selected to press the first biasing member against the clamp with a selected amount of force.

9. The release device of claim 6, wherein the first biasing member and the fastener cooperate to adjust a compression exerted by the clamp on the mount in the retaining position to a desired retaining compression by securing the fastener to the shank in a position on the shank that compresses the first biasing member to a length selected to cause the first biasing member to exert a desired bias force against the clamp.

10. The release device of claim 9, wherein the desired retaining compression is selected to cause the mount to move from the retaining position to the release position when the fishing line is under a selected minimum amount of tension corresponding to a desired type of fish pulling on the fishing line.

11. The release device of claim 6, wherein the first biasing member, the second biasing member, and the fastener cooperate to adjust the compression exerted by the clamp on the mount in the retaining position to a desired retaining compression by securing the fastener to the shank in a position on the shank that compresses the first biasing member and the second biasing member to respective lengths selected to cause the first biasing member to exert a desired first bias force against the clamp and the second biasing member to exert a desired second bias force against the clamp, where the first bias force increases the compression exerted by the clamp and the second bias force decreases the compression exerted by the clamp.

12. The release device of claim 11, wherein the desired retaining compression is selected to cause the mount to move from the retaining position to the release position when the fishing line is under a selected minimum amount of tension corresponding to a desired type of fish pulling on the fishing line.

13. The release device of claim 6, wherein the friction member defines a truncated disk having a truncated portion, the truncated portion being disposed towards the mount and spaced from the mount when the friction member is in the disengaged position.

14. The release device of claim 13, wherein the recess defines a first recess and the friction member defines a second recess and a third recess at circumferential positions offset from the first recess.

15. The release device of claim 6, wherein the mount defines a bobbin.

* * * * *